(12) United States Patent
Hubbard

(10) Patent No.: US 7,043,869 B1
(45) Date of Patent: May 16, 2006

(54) MODULAR PORTABLE MULTI ROD FISHING STAND

(76) Inventor: Jaimie Jay Hubbard, 1600 LaSalle St., apt. B-106, Sherman, TX (US) 75090

( * ) Notice: Subject to any disclaimer, the term of this patent is extended or adjusted under 35 U.S.C. 154(b) by 0 days.

(21) Appl. No.: 11/006,443

(22) Filed: Dec. 7, 2004

(51) Int. Cl.
*A01K 97/10* (2006.01)

(52) U.S. Cl. ............................................. 43/21.2

(58) Field of Classification Search ............... 43/21.2; 248/514, 518, 530, 534, 538
See application file for complete search history.

(56) References Cited

U.S. PATENT DOCUMENTS

| | | | |
|---|---|---|---|
| 2,137,645 A | 11/1938 | Doench | |
| 2,773,603 A | 12/1956 | Gronek | |
| 3,184,192 A | 5/1965 | Hoerr | |
| 3,385,544 A * | 5/1968 | Barnett | 248/513 |
| 3,444,643 A * | 5/1969 | Dobbs | 43/17 |
| 3,667,708 A | 6/1972 | Smeltzer | |
| 4,611,427 A | 9/1986 | Coutcher | |
| 4,650,146 A | 3/1987 | Duke | |
| 4,866,873 A | 9/1989 | Van Valkenburg | |
| 4,964,233 A * | 10/1990 | Benson et al. | 43/17 |
| 5,014,458 A * | 5/1991 | Wagner | 43/21.2 |
| 5,058,308 A * | 10/1991 | Girard | 43/17 |
| 5,435,093 A * | 7/1995 | Minorics et al. | 43/19.2 |
| 5,557,877 A * | 9/1996 | Colson | 43/21.2 |
| 5,673,507 A * | 10/1997 | Stokes, Jr. | 43/21.2 |
| 5,685,107 A * | 11/1997 | Sweet | 43/21.2 |
| 5,987,804 A | 11/1999 | Shearer et al. | |
| 6,289,627 B1 * | 9/2001 | Gibbs et al. | 43/21.2 |
| 6,341,443 B1 * | 1/2002 | Watford et al. | 43/17 |
| 6,438,889 B1 * | 8/2002 | Handy | 43/21.2 |
| 6,681,517 B1 | 1/2004 | Solomon | |
| 6,718,682 B1 | 4/2004 | Seitsinger et al. | |

FOREIGN PATENT DOCUMENTS

| | | |
|---|---|---|
| GB | 774.634 | 5/1957 |
| GB | 2.269.518 | 2/1994 |

* cited by examiner

*Primary Examiner*—Kurt Rowan
(74) *Attorney, Agent, or Firm*—Michael I Kroll

(57) ABSTRACT

A movement resistive stand for retaining a plurality fishing rods includes a weighted base member. A pole is connected to the base member and extends vertically therefrom. The stand further includes a first and second bar each having at least one rod holder removeably connected thereto and a means for connecting each one of the first and second bars to the pole. The weighed base prevents the stand from moving from an initial position thereby allowing the at least one rod holder to retain at least one fishing rod therein.

10 Claims, 9 Drawing Sheets

MODULAR PORTABLE MULTI ROD FISHING STAND

BACKGROUND OF THE INVENTION

1. Field of the Invention

The present invention relates generally to stands and, more specifically, to a modular multi rod portable fishing stand able to be broken down into its component parts for storage and carting to a desired location. Upon assembly of the component parts, multiple fishing rods may be selectively mounted thereto. The modular portable fishing stand is comprised of a weighted base having a handle extending therefrom for carrying said base with a post mountable to the base having a hook-like member extending therefrom for suspending user selectable articles, such as a lantern. Located at the top end of the post is a coupling for connecting a transversal bar with a plurality of fishing rod holders mountable thereon. A fishing rod holder is formed of a curvilinear portion in communication with a spaced apart U-shaped member with an extension depending therefrom providing means for fastening the rod holders to the transversal bar. Once a rod is placed therein, the curvilinear portion prevents upward movement while the U-shaped member supports the rod preventing downward movement.

2. Description of the Prior Art

There are other holding devices designed for fishing. Typical of these is U.S. Pat. No. 2,137,645 issued to Doench on Nov. 22, 1938.

Another patent was issued to Gronek on Dec. 11, 1956 as U.S. Pat. No. 2,773,603. Yet another U.S. Pat. No. 3,184,192 was issued to Hoerr on May 18, 1965 and still yet another was issued on Jun. 6, 1972 to Smeltzer as U.S. Pat. No. 3,667,708.

Another patent was issued to Coutcher on Sep. 16, 1986 as U.S. Pat. No. 4,611,427. Yet another U.S. Pat. No. 4,650,146 was issued to Duke on Mar. 17, 1987. Another was issued to Van Valkenburg on Sep. 19, 1989 as U.S. Pat. No. 4,866,873 and still yet another was issued on May 14, 1991 to Wagner as U.S. Pat. No. 5,014,458.

Another patent was issued to Colson on Sep. 24, 1996 as U.S. Pat. No. 5,557,877. Yet another U.S. Pat. No. 5,987,804 was issued to Shearer et al. on Nov. 23, 1999. Another was issued to Solomon on Jan. 27, 2004 as U.S. Pat. No. 6,681,517 and still yet another was issued on Apr. 13, 2004 to Seitsinger et al. as U.S. Pat. No. 6,718,682. Yet another was issued to Huerlmann on May 15, 1957 as U.K. Patent No. GB774,634 and still another was issued on Aug. 14, 1992 to David Frederick Partridge as U.K. Patent No. GB2269518.

U.S. Pat. No. 2,137,645

Inventor: Clarence A. Doench

Issued: Nov. 22, 1938

A fishing pole holder comprising, in combination, a U-shaped standard having two legs secured together at one end by a bight; a one piece support having a series of convolutions fitting about said bight rotatably to secure the support to the standard and having also a U-shaped bend at one end and a ring-shaped bend at the other end, said bends providing receptacles to receive and hold the fishing pole, and a fold in the support, between the convolutions and ringshaped bend providing a stop adapted to engage a leg of the standard to hold the support in one position relatively to said standard.

U.S. Pat. No. 2,773,603

Inventor: John Gronek

Issued: Dec. 11, 1956

A fish bag holder and a fishing pole rest comprising a fish bag supporting frame, said frame including a straight side having a pair of widely spaced apart, upwardly opening notches therein each adapted to receive a fishing pole and support it from below, end members extending from said straight side in a substantially perpendicular relation therewith, side members extending from the ends of said end members, each of said side members being in a substantially parallel relation with said straight side and having a downwardly opening notch therein adapted to receive a fishing pole and engage it from above, the space between said downwardly opening notches being substantially less than the space between said upwardly opening notches so that a fishing pole supported by one of said upwardly opening notches and the downwardly opening notch adjacent thereto will be in a diverging relationship with respect to a fishing pole supported by the other two of said notches, a pair of parallelly disposed arms extending from the ends of said side members, said arms being in a substantially perpendicular relation with said side members and said straight side, a pivot extending laterally from the end of each arm, and bracket means for connecting said frame to the side of a boat and supporting said frame in position over the water adjacent the side of the boat, said bracket means having an opening therein for-receiving said pivots and having a pair of bearing portions upon which said arms may rest, said bearing portions being disposed above said pivot receiving opening to impart an inclination to said frame so that said notches support said fishing poles at the proper inclination.

U.S. Pat. No. 3,184,192

Inventor: Harvey T. Hoerr

Issued: May 18, 1965

A holder for fishing rods and the like, comprising a clamp member of generally U-form, a saddle member interconnected with, and adjustably positionable along the clamp member, and a sling member carried by the saddle member, said saddle member being of generally U-form, with a bight and upright legs, diagonal braces between said legs and bight portion, said sling member comprising a single piece of spring wire with terminal leg portions carried by said upright legs, and a central looped portion with crossed ends, and intermediate portions connecting said crossed ends and said terminal leg portions, and perpendicular to each.

U.S. Pat. No. 3,667,708

Inventor: John F. Smeltzer

Issued: Jun. 6, 1972

1. In combination, a cylindrical bucket means having upper and lower ends, the upper end of said bucket means serving as a seat for the fisherman and a flexible band means removably embracing said bucket means adjacent the lower end thereof, a first tubular support member having upper and lower ends, said first tubular support members being selectively pivotally secured at its lower end to said band means and normally extending upwardly and outwardly therefrom and being adapted for supporting one end of a fishing pole means therein; second and third tubular support members having upper and lower ends and being selectively pivotally secured at their lower ends to said band means on the opposite sides of said bucket means, said second and third tubular support members normally extending upwardly from said band means, each of said second and third tubular supports adapted to selectively receive one of a fishing pole means and light means therein and to support the same, said first tubular support member being positioned on said band means between said second and third support members, and means for tightening said band means on said bucket means.

U.S. Pat. No. 4,611,427

Inventor: Halsey Coutcher

Issued: Sep. 16, 1986

A three member fishing rod holder including a ground engaging leg and two pivotally connected arms with fishing rod supporting fingers. The leg and arm is configured for folding into compact storage position with leg and arms in side-by-side relationship.

U.S. Pat. No. 4,650,146

Inventor: Ned E. Duke

Issued: Mar. 17, 1987

A device for supporting at least one surf fishing rod at an appropriate angle for fishing to alleviate the need for the person fishing to hold the fishing rod while fishing. The device is adjustable to allow the fisherman to adjust the direction of the rod or rods. The height of the device is adjustable for the convenience of the person fishing. An additional rod support means is provided to facilitate rod preparation. The entire device is constructed to be watertight and contains a flotation insert to prevent the device from sinking in water. In an additional embodiment, the fishing rod holder may be used as a handle for a bait bucket fitted with wheels.

U.S. Pat. No. 4,866,873

Inventor: Kit Van Valkenburg

Issued: Sep. 19, 1989

This invention discloses a fishing pole holder apparatus including a rod stake member, a slide hammer member and a fishing pole support bracket. The stake member is provided with an impact end member and an attachment portion for pivotally mounting the fishing pole support bracket. The impacting slide hammer is mechanically attached to the stake member and is used for imparting a force to the stake member. The fishing pole support bracket is attachable to the stake member for holding a fishing pole in a casted position and includes a bent rod piece integrally shaped having a pivotal attachment, a first pole support integral to the pivotal attachment and a second pole support integral to said first pole support. The first and second pole supports cradle the reel end of a fishing pole while the attachment portion provides horizontal angle flexibility for holding the pole.

U.S. Pat. No. 5,014,458

Inventor: Larry C. Wagner

Issued: May 14, 1991

A fishing pole holder for holding a fishing pole to a boat. The fishing pole holder includes base structure for being fixedly and permanently attached to the boat; body structure for being slidably and removably attached to the base structure; and fishing pole holder structure for being attached to the body structure and for holding the fishing pole to the body structure.

U.S. Pat. No. 5,557,877

Inventor: Kennie R. Colson

Issued: Sep. 24, 1996

A universal mount fishing rod holder for holding a plurality of fishing rods in a position for use when fishing including a rigid planar base coupled to a tubular receptacle; a coupling mechanism for securing the base to an external recipient object; a rigid planar bar positioned above the base; an elongated support rod having one end removably coupled within the receptacle of the base and another end pivotally coupled to the bar; and a plurality of spaced and parallely aligned rod holders with each rod holder formed of an elongated rigid piece of wire having an anterior section with a generally v-shaped seat for holding a portion of a fishing rod, a posterior section with a loop for receiving an end of a fishing rod, and a central section extended therebetween and coupled to the bar.

U.S. Pat. No. 5,987,804

Inventor: Joseph Shearer et al.

Issued: Nov. 23, 1999

A holder for multiple fishing rods pivotally attached to the support column of a swivel mounted boat chair, with cradles for each rod capable of independent angular adjustment. The rod cradles are mounted to an arcuate mounting member which allows the rods to be regularly spaced yet remain equidistant from the user. A vertically adjustable arm is secured perpendicularly to the support column of a chair using a collar and hand operated threaded fastener. Releasably attached the other end of the arm is a laterally disposed arcuate support member, supporting a plurality of fishing rod holders. A unitary fishing rod cradle made up of parallel horizontal side rails, a U-shaped rod receiver, a loop rod stabilizer, and an arcuate pivot support slot for pivotal attachment to the arcuate support member.

U.S. Pat. No. 6,681,517

Inventor: Seth Solomon

Issued: Jan. 27, 2004

A fishing rod holder for mounting on a pedestal of and under a seat of a fishing chair carried by a deck of a boat. The fishing rod holder provides for retaining one or more fishing rods in a variety of angularly oriented positions, such a storage position and a position where the fishing lines are cast in the water. The holder is formed as an open frame defined by a top plate, a parallel bottom plate and a pair or more side plates extending between the top plate and the bottom plate. Openings in the top and bottom plates allow sliding of the holder on the pedestal of the fishing chair. Tubular members are secured on angular braces connecting the top plate(s) with the side plates. The tubular members receive ends of fishing rod handles when the fishing rods are oriented in the operational position.

U.S. Pat. No. 6,718,682

Inventor: Rick W. Seitsinger

Issued: Apr. 13, 2004

A fishing rod holder having one or more rod stations attached to a support bar. Each rod station includes a loop terminating in a pair of legs received in a pair of apertures in the support bar. In a preferred embodiment, the rod holder provides a plurality of rod stations to improve a fisherman's chances of catching a fish. In another preferred embodiment, the rod holder is configured with a pair of clamps receivable over the rim of a bucket allowing the rod holder to be used virtually anywhere. The bucket may be filled with water to provide storage for live bait.

U.K. Patent Number GB774,634

Inventor: Hans Huerlimann

Issued: May 15, 1957

A stand for a fishing rod comprises a cage 2 adapted to receive and hold the end of the rod and adjustably carried by a plurality of legs 7, 8, 9 and one 7, of which extends longitudinally of the cage and has a foot 10 pivotally mounted on its end. The cage is elongated and comprises three wires 30, 31, 32, disposed parallel to the leg 7 having the foot 10. The front ends of the wires are connected by a curved member 33 which partly surrounds the rod; the rear ends are connected to a metal annulus 6 and between their ends the wires are fixed to a wire ring 4. The portions of the wires to the rear of the ring 4 are slightly bent downwardly. The rear end of one of the wires is bent inwardly to form a stop. The legs 7, 8, 9 are made of metal tube and are slidably mounted in sleeves welded or pivoted to the metal annulus 6, clamping screws 12 being provided on the sleeves. The foot 10 is formed by a wire loop which may have an undulating wire welded to its end portion and is secured to a pair of arms 14 pivotally mounted on a pair of spaced semi-circular plates 15 welded to the lower end of the leg 7. The angular disposition of the foot relative to the leg 7 is deter-mined by passing a pin 17 through a hole in one of the arms 14 and through one of a plurality of pairs of aligned holes 16 in the plates 15. The foot is anchored to the ground by a tapered peg 201 having an adjustable sleeve 21 clamped thereon by a screw 23 and provided with a hook 22 adapted to engage the foot. For transportation the legs 8, 9 are clamped in sleeves 24 secured to the leg 7, the peg 201 is clamped by a screw 34 in the end of the leg 8 and the foot is folded into contact with the leg 7 and held by the projecting end 18 of one of the wires forming the cage.

U.K. Patent Number GB2269518

Inventor: David Frederick Partridge

Issued: Feb. 16, 1994

In a mount (2) for a fishing rod support (1) constituted by first and second telescopic struts (4 and (3) (FIG. 2), the mount (2) is provided with a connector (6) for fixing the support (1) substantially at right-angles thereto, and locking means (8, 9) are provided for locking the two struts (4 and 3) together in any of a plurality of telescopic configurations, the free end of the second strut (3) being pointed and provided with an external screw thread (3b) for threading into the ground.

While these fishing rod stands may be suitable for the purposes for which they were designed, they would not be as suitable for the purposes of the present invention, as hereinafter described.

SUMMARY OF THE PRESENT INVENTION

The present invention relates generally to stands and, more specifically, to a modular multi rod portable fishing stand able to be broken down into its component parts for storage and carting to a desired location. Upon assembly of the component parts, multiple fishing rods may be selectively mounted thereto. The modular portable fishing stand is comprised of a weighted base having a handle extending therefrom for carrying said base with a post mountable to the base having a hook-like member extending therefrom for suspending user selectable articles, such as a lantern. Located at the top end of the post is a coupling for connecting a transversal bar with a plurality of fishing rod holders mountable thereon. A fishing rod holder is formed of a curvilinear portion in communication with a spaced apart U-shaped member with an extension depending therefrom providing means for fastening the rod holders to the transversal bar. Once a rod is placed therein, the curvilinear portion prevents upward movement while the U-shaped member supports the rod preventing downward movement.

A primary object of the present invention is to provide a modular portable stand for use with a plurality of fishing rods that overcomes the shortcomings of the prior art.

Another object of the present invention is to provide a fishing rod stand that does not need to be fastened or fixed to any other article to function.

Yet another object of the present invention is to provide a fishing rod stand having a weighted base whereby said stand will resist movement from a user selected positioning.

Still yet another object of the present invention is to provide a fishing rod stand having a post that is mountable to the weighted base.

Another object of the present invention is to provide a fishing rod stand wherein said post has a hook-like member for suspending user selectable articles.

Yet another object of the present invention is to provide a fishing stand having at least one mountable transverse member.

Still yet another object of the present invention is to provide a fishing rod stand wherein said post has a coupling at one end providing means for mounting said transverse member.

Another object of the present invention is to provide said transverse member with means for mounting a plurality of fishing rod holders.

Yet another object of the present invention is to provide a fishing rod holder with a post for mounting to the transverse member.

Still yet another object of the present invention is to provide a fishing rod holder having a curvilinear member in communication with a spaced apart U-shaped member.

Another object of the present invention is to provide a fishing rod holder for inserting a fishing rod wherein one part supports the rod while the other prevents upward movement.

Yet another object of the present invention is to provide a fishing rod stand that can be disassembled for storage and for carrying to a user selected location.

Additional objects of the present invention will appear as the description proceeds.

The present invention overcomes the shortcomings of the prior art by providing a modular multi rod portable fishing stand whereby the stand can be broken down into its component parts for storage and carting to a desired location, where it can be assembled for mounting multiple fishing rods thereto. The modular portable fishing stand is comprised of a weighted base having a handle extending therefrom for carrying said base with a post mountable to the base having a hook-like member extending therefrom for suspending user selectable articles, such as a lantern. Located at the top end of the post is a coupling for connecting a transversal bar with a plurality of fishing rod holders mountable thereon. A fishing rod holder is formed of a curvilinear portion in communication with a spaced apart U-shaped member with an extension depending therefrom providing means for fastening the rod holders to the transversal bar. Once a rod is placed therein, the curvilinear portion prevents upward movement while the U-shaped member supports the rod preventing downward movement.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
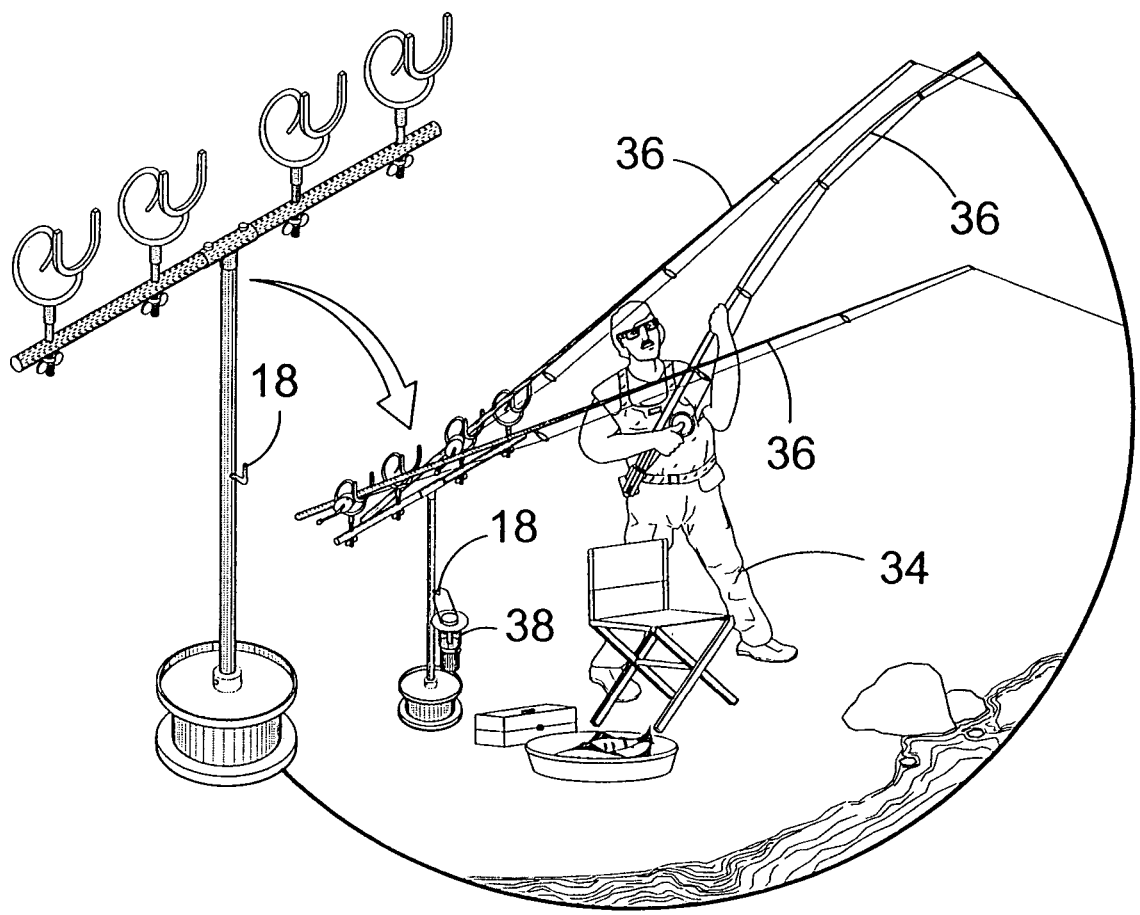
FIG. 1 is an illustrative view of the fishing rod holder of the present invention in use.

Turning now descriptively to the drawings, in which similar reference characters denote similar elements throughout the several views, the Figures illustrate the portable collapsible multipole fishing stand of the present invention. With regard to the reference numerals used, the following numbering is used throughout the various drawing figures.

10 fishing stand of the present invention
12 weighted base
14 handle on weighted base
16 vertical post
18 hook
20 transversal bar
22 "T" joint
23 U-shaped neck
24 rod holder
25 curvilinear member
26 spacers
28 wing nuts
30 top transversal bar aperture
31 threads
32 bottom transversal bar aperture
34 fisherman
36 fishing rod
38 lantern
40 vertical post apertures
42 base aperture
44 connector
46 connector aperture
48 base "T" joint aperture
50 pin
52 fastening pin
54 horizontal "T" joint aperture

DETAILED DESCRIPTION OF THE PREFERRED EMBODIMENT

The following discussion describes in detail one embodiment of the invention and several variations of that embodiment. This discussion should not be construed, however, as limiting the invention to those particular embodiments. Practitioners skilled in the art will recognize numerous other embodiments as well. For a definition of the complete scope of the invention, the reader is directed to the appended claims.

Turning now descriptively to the drawings, in which similar reference characters denote similar elements throughout the several views, FIGS. 1 through 9 illustrate the portable collapsible multipole fishing stand of the present invention which is indicated generally by the numeral 10.

The portable collapsible multipole fishing stand 10 is shown illustratively in FIG. 1. Shown herein a fisherman 34 is holding a fishing rod 36 to reel in a bite on his line. The multipole fishing stand 10 is shown retaining a plurality of fishing rods 36 that do not have fish biting on the lines of each thereof. The multipole fishing stand 10 further includes a hook 18 positioned on a vertical post for retaining a lantern 38 thereon. This allows the fisherman 34 to have a fishing area illuminated by light from the lantern 38 thereby allowing the fisherman 34 to fish at night.

Figure 2:
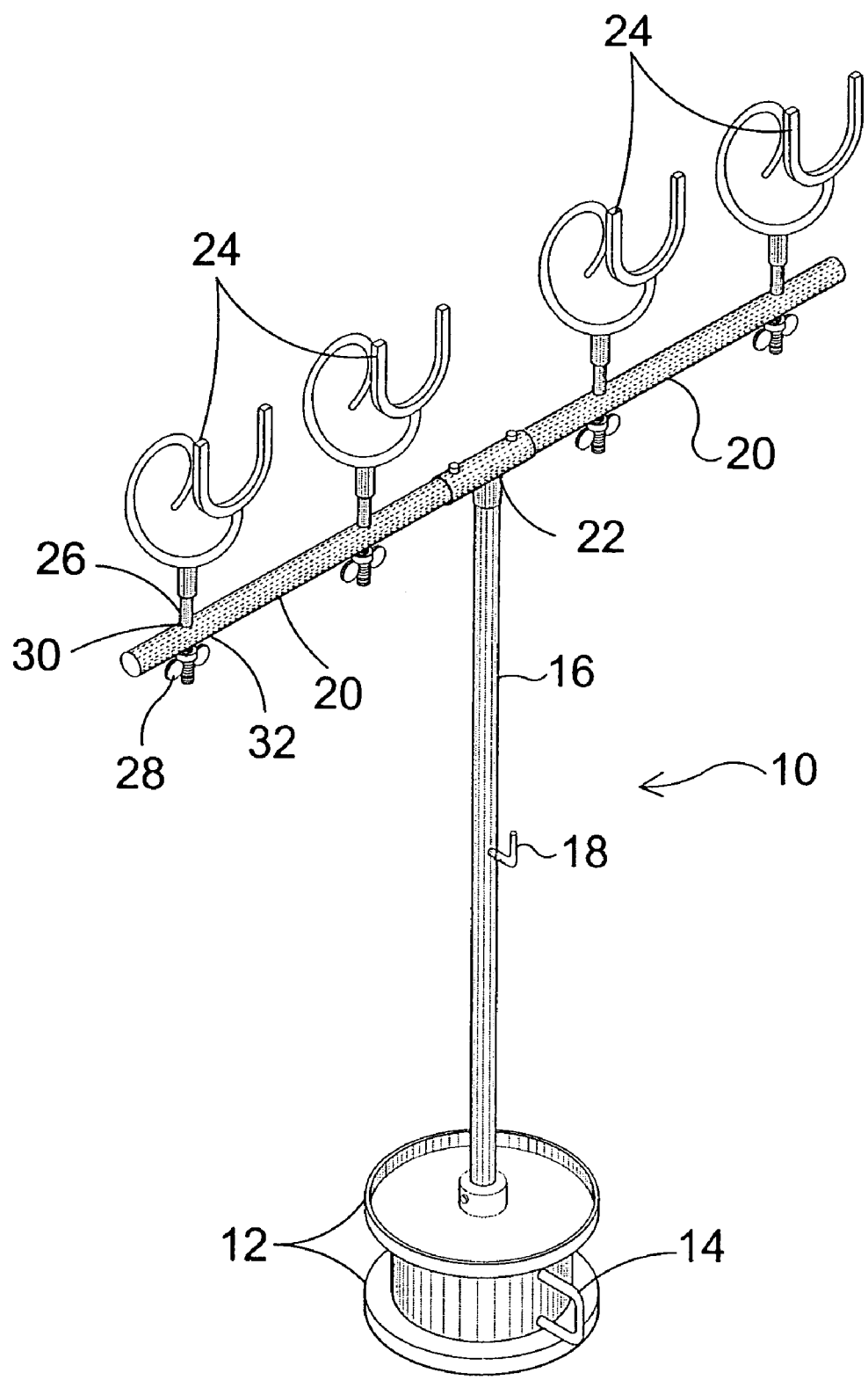
FIG. 2 is a perspective view of the fishing rod holder of the present invention.

A perspective view of the portable collapsible multipole fishing stand 10 is shown in FIG. 2. The fishing stand 10 includes a weighted base 12. While the base 12 is shown being substantially cylindrical in shape, the base 12 may be formed in any geometric shape able to prevent the fishing stand 10 from movement from a desired position. A handle 14 is integrally attached to the weighted base 12 for carry the weighted base 12. A vertical post 16 extends upwardly out from the weighted base 12. The hook 18 is positioned on the vertical post 16 for the hanging of objects including but not limited to the lantern 38, a hat, or a vest. A plurality of transversal bars 20 are connected to vertical pole 16 via a "T" joint 22. Each transversal bar 20 has a plurality of top transversal bar apertures 30 and a plurality of bottom transversal bar apertures 32 that correspond to the top transversal bar apertures 30. A plurality of rod holders 24 are connected to each of the transversal bars 20 through the apertures 30,32 thereof. The rod holder 24 includes a U-shaped member 23 and a curvilinear member 25 connected to the U-shaped member 23 at a base thereof A male connector 27 extends substantially perpendicular from substantially a center of the curvilinear member 25. The male connector 27 of each rod holder 24 is inserted through a spacer 26. The portion of the male connector 27 protruding from the spacer 26 is inserted into a top transversal bar aperture 30 and further through the bottom transversal bar aperture 32 of the transversal bar 20. A wing nut 28 is screwed onto the male connector 27 of each rod holder 24 that extends through the bottom transversal bar aperture 32 on transversal bar 20. The spacer 26 positioned between the rod holder 24 and the transversal bar 20 provides space therebetween and aides in balancing the fishing stand 10 when a plurality of rods are retained by the plurality of rod holders 24.

Figure 3:
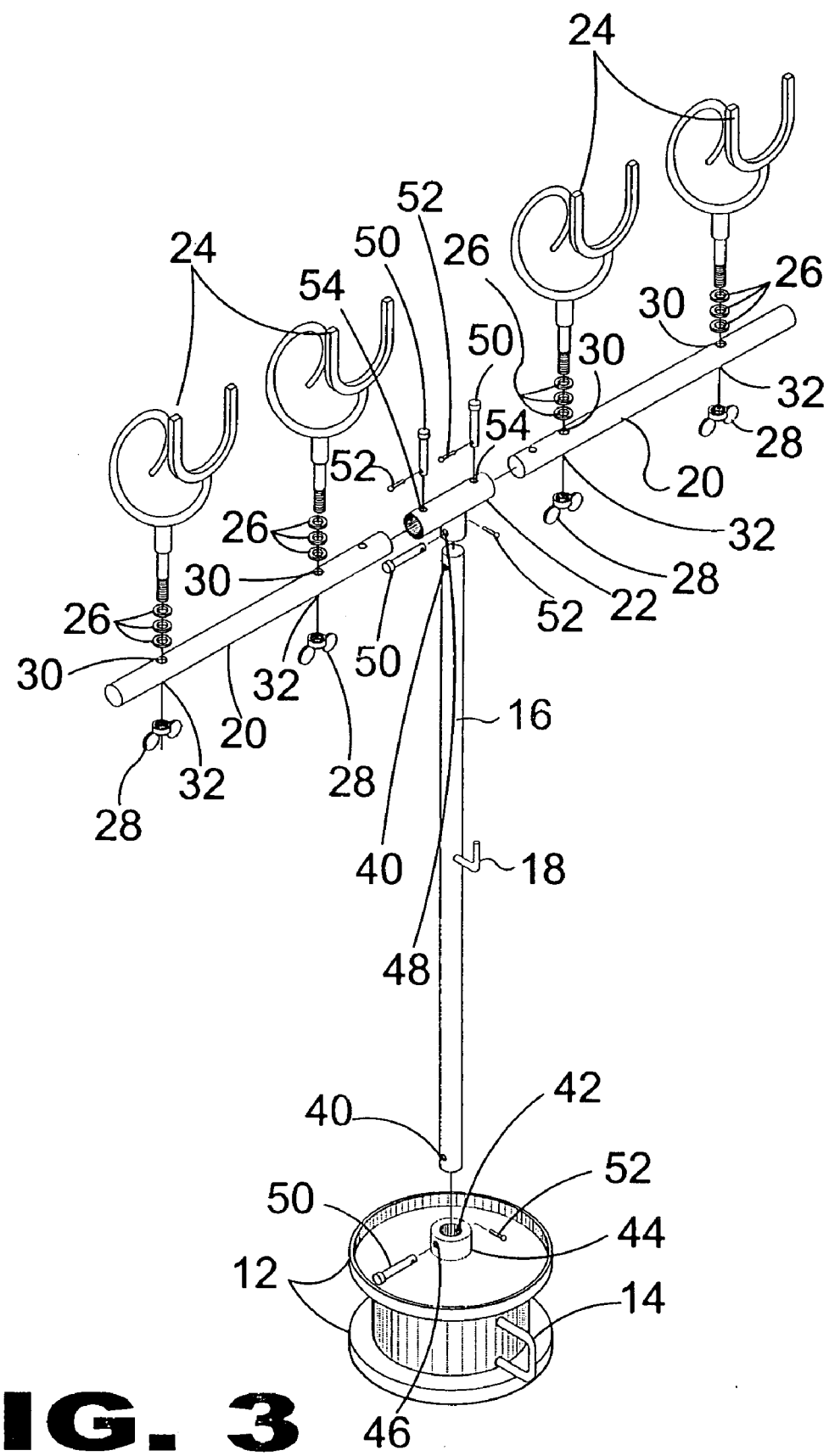
FIG. 3 is an exploded view of the fishing rod holder of the present invention.

An exploded view of the portable collapsible multipole fishing stand 10 is shown in FIG. 3. The weighed base 12 includes the handle 14 integrally attached thereto for carrying the weighted base 12. The weighted base 12 contains a base aperture 42. A connector 44 is integrally attached on top of base aperture 42 at substantially a center point thereof for insertion of vertical post 16. Each end of the vertical post 16 has two vertical post apertures 40 spaced equidistant from each other and are positioned at equal predetermined distances from each end of the vertical post. A pin 50 is received by the first of two connector apertures 46 extending through the connector 44. After passing through the vertical post apertures 40, and the second connector aperture 46, the pin 50 is locked in place on the by fastening pin 52. A hook 18 is integrally attached to the vertical post 16 for the hanging of objects including but not limited to the lantern 38, a hat, or a vest.

A top end of vertical post 16 opposite the end connected to the base 12, is inserted into a base of "T" joint 22. The "T" joint 22 includes base apertures 48 positioned at the base of the "T" joint 22 and arm apertures 54 positioned at each respective arm of the "T" joint 22. The vertical post 16 is received by the base of the "T" joint 22 and the base apertures 48 match the vertical post apertures 40. A pin 50 is received by the base "T" joint aperture 48 and further through the vertical post apertures 40 and upon extending from the second base aperture 48 is locked in place by a fastening pin 52.

Transversal bar 20 is inserted into the arm connector of the "T" joint 22. The transversal bar 20 has a plurality of top transversal bar apertures 30 and a plurality of corresponding bottom transversal bar apertures 32. An end of the transversal bar 20 is received by the arm connector of the "T" joint 22 and a respective pair of top and bottom transversal bar apertures 30, 32 match the arm apertures 54. A pin 50 is received by the first of two arm apertures 54 and further passed through the top and bottom transversal bar apertures 30, 32 and upon extending from the second arm aperture 54 is locked in place by a fastening pin 52.

A plurality of rod holders 24 are connected to each of the transversal bars 20 though the apertures 30, 32 thereof. The rod holder 24 includes a U-shaped member 23 and a curvilinear member 25 connected to the U-shaped member 23 at a base thereof. A male connector 27 extends substantially perpendicular from substantially a center of the curvilinear member 25. The male connector 27 of each rod holder 24 is inserted through a spacer 26. The portion of the male connector 27 protruding from the spacer 26 is inserted into a top transversal bar aperture 30 and further through the bottom transversal bar aperture 32 of the transversal bar 20. A wing nut 28 is screwed onto the male connector 27 of each rod holder 24 that extends through the bottom transversal bar aperture 32 on transversal bar 20. The spacer 26 positioned between the rod holder 24 and the transversal bar 20 provides space therebetween and aides in balancing the fishing stand 10 when a plurality of rods are retained by the plurality of rod holders 24.

Figure 4:
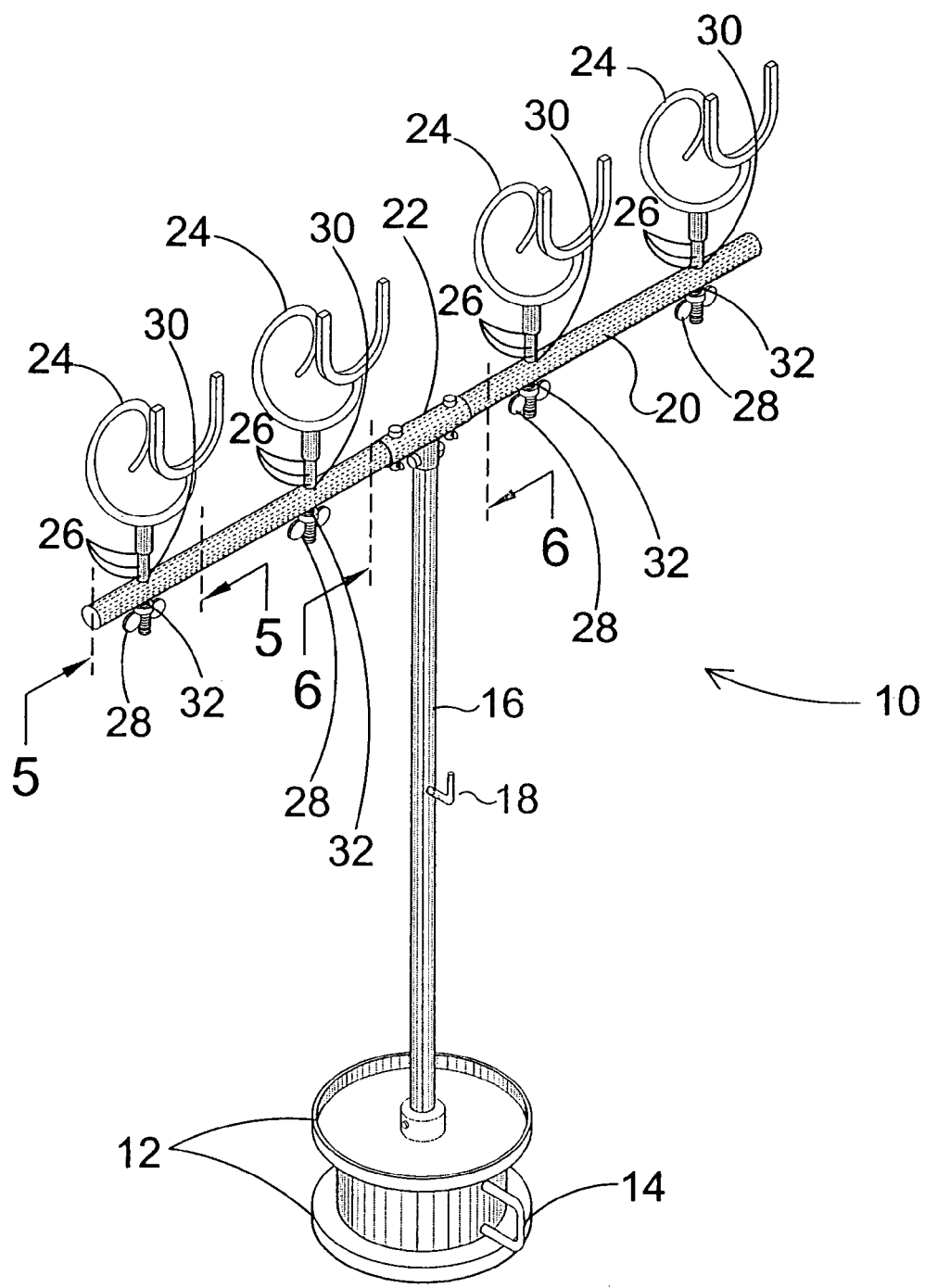
FIG. 4 is a perspective view of the fishing rod holder of the present invention.

FIG. 4 is a perspective view of the multipole fishing stand 10 of the present invention. The fishing stand 10 includes a weighted base 12. While the base 12 is shown being substantially cylindrical in shape, the base 12 may be formed in any geometric shape able to prevent the fishing stand 10 from movement from a desired position. A handle 14 is integrally attached to the weighted base 12 for carry the weighted base 12. A vertical post 16 extends upwardly out from the weighted base 12. The hook 18 is positioned on the vertical post 16 for the hanging of objects including but not limited to the lantern 38, a hat, or a vest. A plurality of transversal bars 20 are connected to vertical pole 16 via a "T" joint 22. Each transversal bar 20 has a plurality of top transversal bar apertures 30 and a plurality of bottom transversal bar apertures 32 that correspond to the top transversal bar apertures 30. A plurality of rod holders 24 are connected to each of the transversal bars 20 though the apertures 30, 32 thereof. The rod holder 24 includes a U-shaped member 23 and a curvilinear member 25 connected to the U-shaped member 23 at a base thereof. A male connector 27 extends substantially perpendicular from substantially a center of the curvilinear member 25. The male connector 27 of each rod holder 24 is inserted through a spacer 26. The portion of the male connector 27 protruding from the spacer 26 is inserted into a top transversal bar aperture 30 and further through the bottom transversal bar aperture 32 of the transversal bar 20. A wing nut 28 is screwed onto the male connector 27 of each rod holder 24 that extends through the bottom transversal bar aperture 32 on transversal bar 20. The spacer 26 positioned between the rod holder 24 and the transversal bar 20 provides space therebetween and aides in balancing the fishing stand 10 when a plurality of rods are retained by the plurality of rod holders 24.

Figure 5:
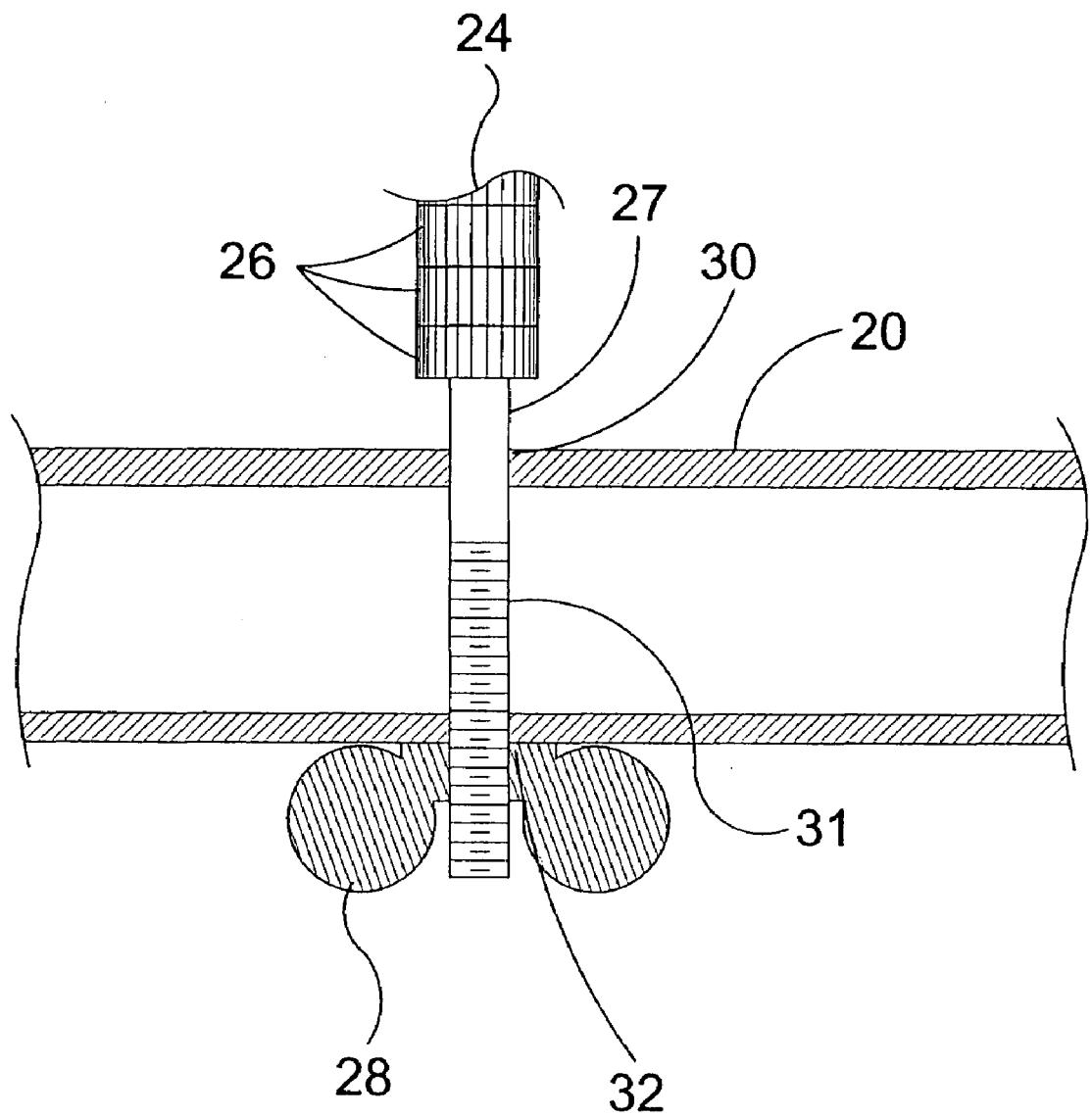
FIG. 5 is a cross sectional view of the fishing rod holder of the present taken along line 5—5 in FIG. 4.

FIG. 5 is a cross sectional view of the transversal bar 20 taken along line 5—5 of FIG. 4. The cross-sectional view shown in FIG. 5 shows the rod holder 24 connected to transversal bar 20. The male connector 27 of each rod holder 24 is inserted through a plurality of spacers 26 thereby providing space between the rod holder 24 and the transversal bar 20. The portion of the male connector 27 extending through the spacers 26 is inserted into a top transversal bar aperture 30 in transversal bar 20 and extends out from the bottom transversal bar aperture 32. The portion of the connector 27 extending out from the bottom transversal bar aperture 32 includes threads 31. The wing nut 28 is screwed onto the threads 31 of the male connector 27 for securing the rod holder 24 to the transversal bar 20.

Figure 6:
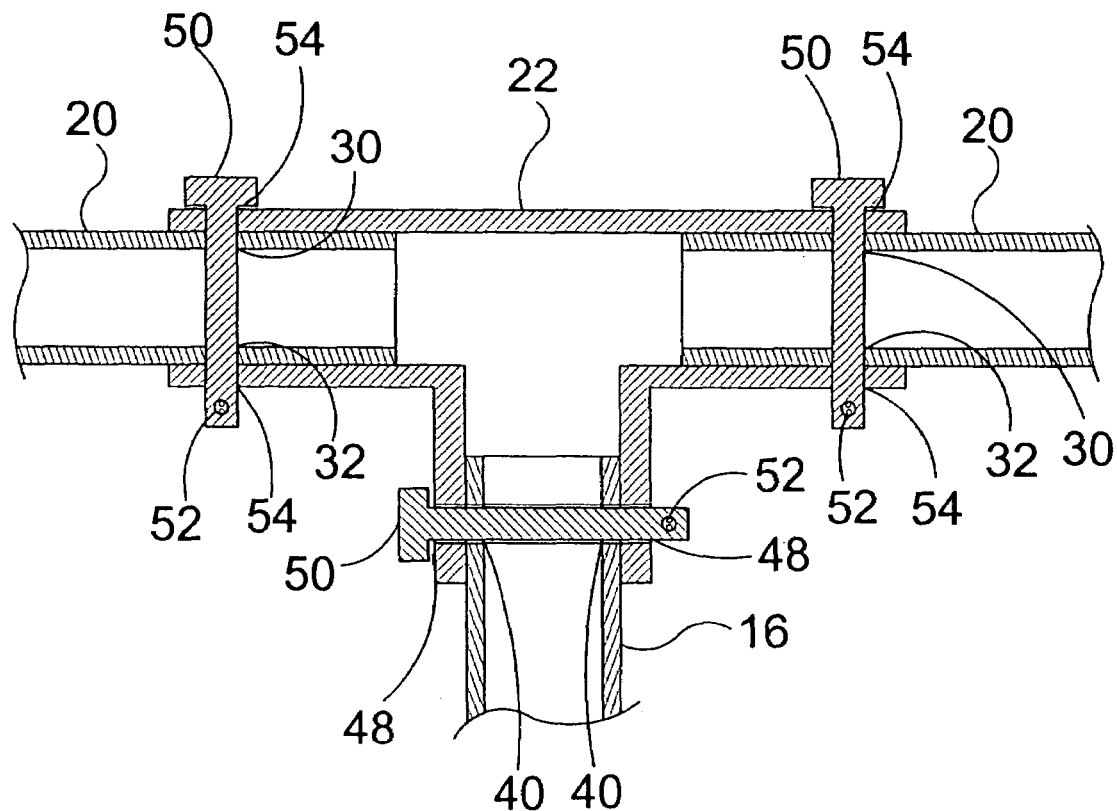
FIG. 6 is a cross sectional view of the fishing rod holder of the present invention taken along line 6—6 in FIG. 4.

FIG. 6 is a cross sectional view of transversal bars 20 and vertical post 16 connected to the "T" joint 22 of the portable collapsible multipole fishing stand 10 taken along line 6—6 in FIG. 4. A top end of vertical post 16 opposite the end connected to the base 12, is inserted into a base of "T" joint 22. The "T" joint 22 includes base apertures 48 positioned at the base of the "T" joint 22 and arm apertures 54 positioned at each respective arm of the "T" joint 22. The vertical post 16 is received by the base of the "T" joint 22 and the base apertures 48 match the vertical post apertures 40. A pin 50 is received by the base "T" joint aperture 48 and further through the vertical post apertures 40 and upon extending from the second base aperture 48 is locked in place by a fastening pin 52.

Transversal bar 20 is inserted into the arm connector of the "T" joint 22. The transversal bar 20 has a plurality of top transversal bar apertures 30 and a plurality of corresponding bottom transversal bar apertures 32. An end of the transversal bar 20 is received by the arm connector of the "T" joint 22 and a respective pair of top and bottom transversal bar apertures 30, 32 match the arm apertures 54. A pin 50 is received by the first of two arm apertures 54 and further passed through the top and bottom transversal bar apertures 30, 32 and upon extending from the second arm aperture 54 is locked in place by a fastening pin 52.

Figure 7:
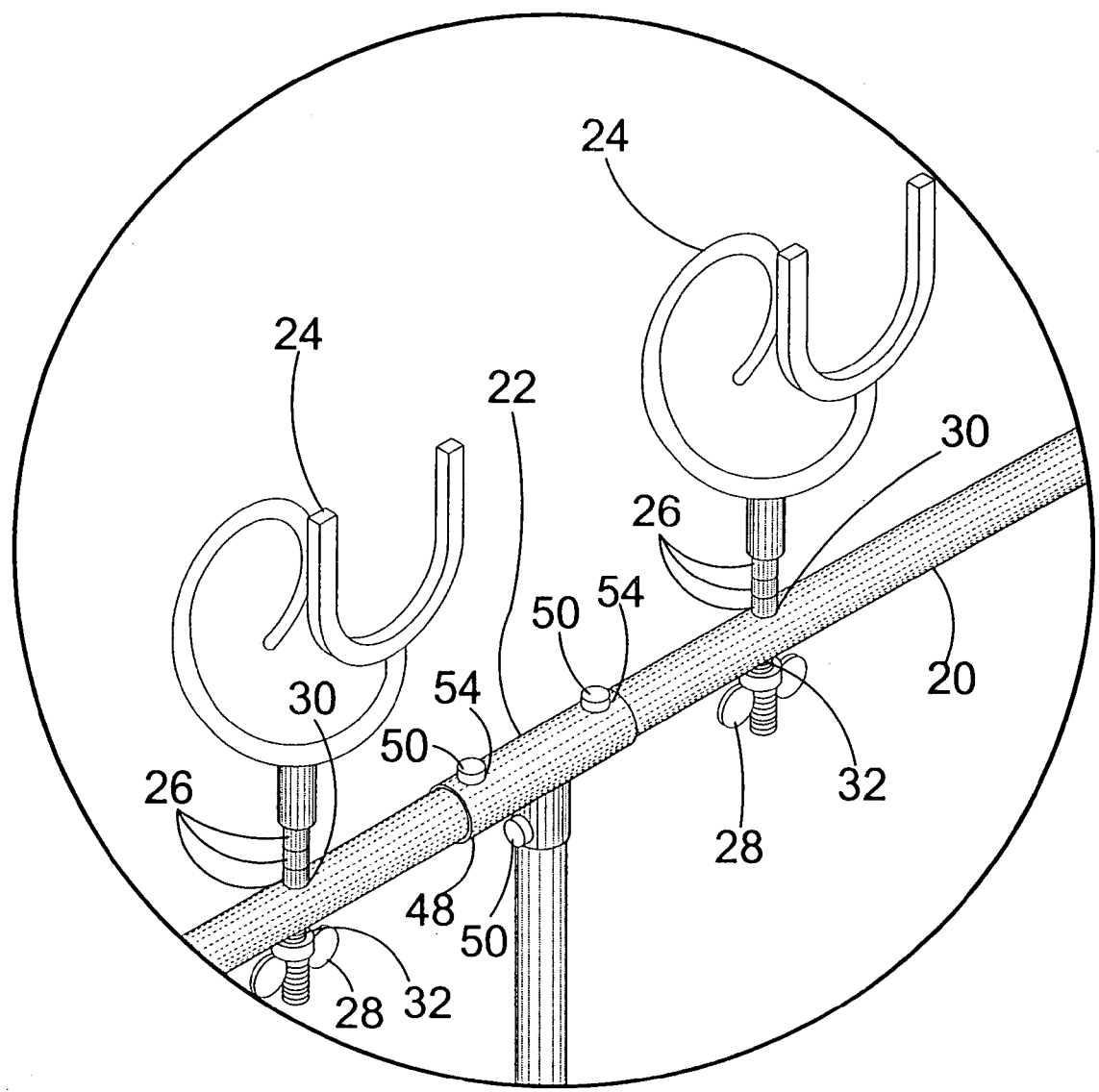
FIG. 7 is a detailed view of the rod holder of the fishing rod holder of the present invention.

FIG. 7 is a detailed view of the rod holders 24 connected to the transversal pole 20 of the portable collapsible multipole fishing stand 10 of the present invention. A top end of vertical post 16 opposite the end connected to the base 12, is inserted into a base of "T" joint 22. The "T" joint 22 includes base apertures 48 positioned at the base of the "T" joint 22 and arm apertures 54 positioned at each respective arm of the "T" joint 22. The vertical post 16 is received by the base of the "T" joint 22 and the base apertures 48 match the vertical post apertures 40. A pin 50 is received by the base "T" joint aperture 48 and further through the vertical post apertures 40 and upon extending from the second base aperture 48 is locked in place by a fastening pin 52.

Transversal bar 20 is inserted into the arm connector of the "T" joint 22. The transversal bar 20 has a plurality of top transversal bar apertures 30 and a plurality of corresponding bottom transversal bar apertures 32. An end of the transversal bar 20 is received by the arm connector of the "T" joint 22 and a respective pair of top and bottom transversal bar apertures 30, 32 match the arm apertures 54. A pin 50 is received by the first of two arm apertures 54 and further passed through the top and bottom transversal bar apertures 30, 32 and upon extending from the second arm aperture 54 is locked in place by a fastening pin 52.

A plurality of rod holders 24 are connected to each of the transversal bars 20 through the apertures 30, 32 thereof. The rod holder 24 includes a U-shaped member 23 and a curvilinear member 25 connected to the U-shaped member 23 at a base thereof. A male connector 27 extends substantially perpendicular from substantially a center of the curvilinear member 25. The male connector 27 of each rod holder 24 is inserted through a spacer 26. The portion of the male connector 27 protruding from the spacer 26 is inserted into a top transversal bar aperture 30 and further through the bottom transversal bar aperture 32 of the transversal bar 20. A wing nut 28 is screwed onto the male connector 27 of each rod holder 24 that extends through the bottom transversal bar aperture 32 on transversal bar 20. The spacer 26 positioned between the rod holder 24 and the transversal bar 20 provides space therebetween and aides in balancing the fishing stand 10 when a plurality of rods are retained by the plurality of rod holders 24.

Figure 8:
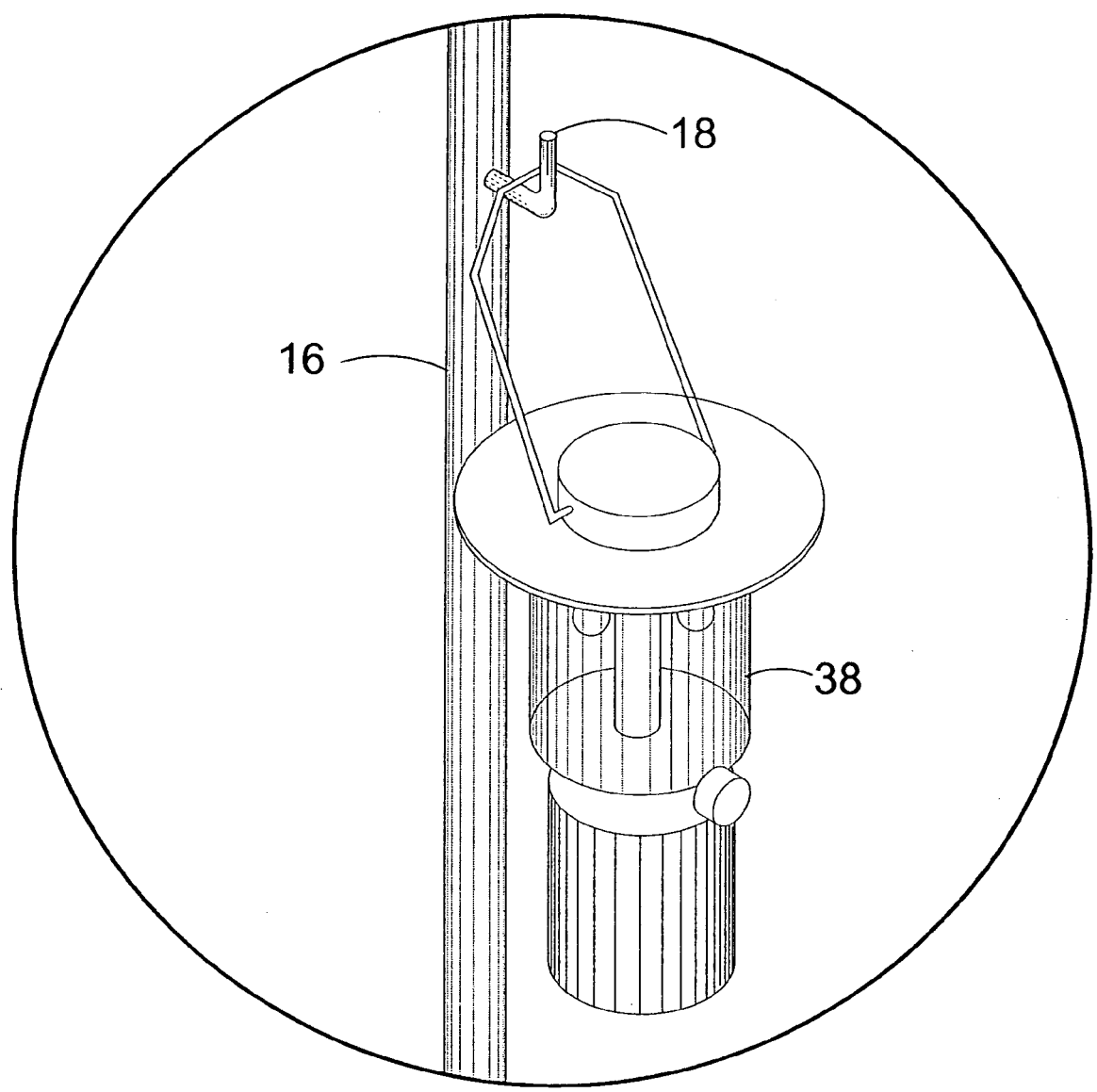
FIG. 8 is a detailed view of the lantern hook of the fishing rod holder of the present invention.

FIG. 8 is a detailed view of the vertical pole 16 with the hook 18 formed intergrally therewith. The hook 18 allows for a user to hang a plurality of objects thereon. The objects able to be hanged on the hook 18 include but are not limited to the lantern 38 for nighttime fishing, a hat, or a vest. However, the items are disclosed for purposes of example only and any item may be hanged on hook 18.

Figure 9:
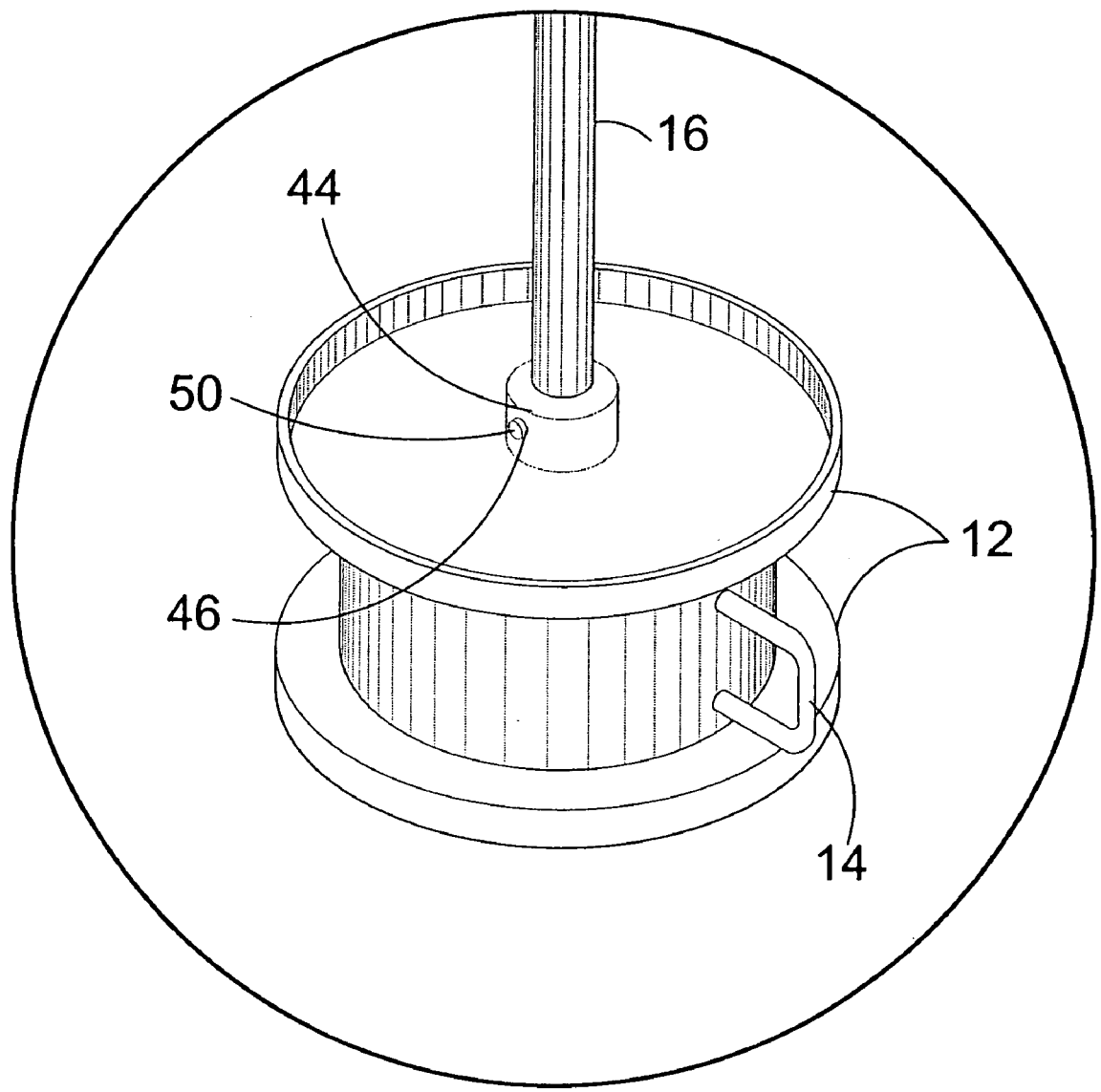
FIG. 9 is a detailed view of the weighted rim base of the fishing rod holder of the present invention.

FIG. 9 is a detailed view of the weighted base 12 of the portable collapsible multipole fishing stand 10 of the present invention. The weighed base 12 includes the handle 14 integrally attached thereto for carrying the weighted base 12. The weighted base 12 contains a base aperture 42. A connector 44 is integrally attached on top of base aperture 42 at substantially a center point thereof for insertion of vertical post 16. Each end of the vertical post 16 has two vertical post apertures 40 spaced equidistant from each other and are positioned at equal predetermined distances from each end of the vertical post. A pin 50 is received by the first of two connector apertures 46 extending through the connector 44. After passing through the vertical post apertures 40, and the second connector aperture 46, the pin 50 is locked in place on the by fastening pin 52 as shown herein above with respect to FIG. 3.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A movement resistive stand for retaining a plurality fishing rods, said stand comprising:
   a) a weighted base member;
   b) a pole connected to said base member and extending vertically therefrom;
   c) a first and second bar each having at least one rod holder removeably connected thereto; and
   d) means for connecting each one of said first and second bars to said pole, wherein said weighed base prevents said stand from moving from an initial position thereby allowing said at least one rod holder to retain at least one fishing rod therein, said connecting means being a T-shaped connector, said T-shaped connector comprising:
  i) a bottom connector having a pair of bottom connector apertures extending through said bottom connector and aligned with one another along a 180 degree plane; and
  ii) two arm connectors, each respective one of said arm connectors having a pair of arm apertures extending through said arm connector and aligned with one another along a 180 degree plane;
e) a base connector positioned at substantially a center of a top side of said weighted base, said base connector having a pair of base apertures extending through said base connector and aligned with each other in a 180 degree plane;
f) a pin and fastener for fastening said pin, wherein said pole further comprises:
  i) a first pair of pole apertures positioned a predetermined distance from a first distal end of said pole, said first pair of pole apertures extend though said pole and are aligned with one another in a 180 degree plane; and
  ii) a second pair of pole apertures positioned a predetermined distance from a second distal end of said pole opposite said first distal end, said second pair of pole apertures extend though said pole and are aligned with one another in a 180 degree plane, and said first distal end is received by said base connector, said base apertures are aligned with said first pair of pole apertures whereby said pin is inserted through a first one said base apertures on a first side of said pole and extends through said first pair of pole apertures and further though a second one of said base apertures and exits said pole at a second side of thereof wherein said pin is fastened by said fastener and removeably connects said pole to said weighted base, wherein said first and second bar have a plurality of pairs of bar apertures extending therethrough, wherein each respective pair of bar apertures are aligned along a 180 degree plane, said pairs of bar apertures are positioned equidistant from one another and said first bar is received within a first arm connector and said arm apertures are aligned with a first pair of said bar apertures whereby pin is received through said arm apertures and said first pair of said bar apertures and is fastened by said fastener thereby securing said bar to said arm.

2. The apparatus as recited in claim 1, wherein said second distal end of said pole is received by said bottom connector and said second pair of pole apertures is aligned with said bottom connector apertures and said pin is inserted through a first one of said bottom connector apertures and extends though said second pair of pole apertures and further though a second bottom connector aperture wherein said pin is fastened by said fastener thereby connecting said connecting means to said pole.

3. The apparatus as recited in claim 1, wherein said second bar is received within a second arm connector and said arm apertures are aligned with a first pair of said bar apertures whereby said pin is received through said arm apertures and said first pair of said bar apertures and is fastened by said fastener thereby securing said bar to said arm.

4. The apparatus as recited in claim 3, wherein said at least one rod holder comprises:
  a) a U-shaped member;
  b) a curvilinear member connected at a base of said U-shaped member; and
  c) means connected at substantially a center point of said curvilinear member for attaching said rod holder to at least one of said first bar and said second bar.

5. The apparatus as recited in claim 4, wherein said attaching means includes a male connector having a threaded end for insertion through a respective pair of said bar apertures and a wing nut for releaseably securing said male connector to said at least one of said first bar and said second bar.

6. The apparatus as recited in claim 4, further comprising at least one spacer for creating a predetermined amount of space between said rod holder and at least one of said first bar and said second bar.

7. The apparatus as recited in claim 1, wherein said base includes a handle formed integrally therewith.

8. The apparatus as recited in claim 1, wherein said stand is collapable and easily transported.

9. The apparatus as recited in claim 1, wherein said weighted base includes a predetermined amount of weight able to maintain a plurality of fishing rods wherein each fishing rod has its line cast in a body of water.

10. The apparatus as recited in claim 1, wherein said weighed base maintains said stand in an upright position.

* * * * *